United States Patent [19]

Rose

[11] Patent Number: 4,878,196

[45] Date of Patent: Oct. 31, 1989

[54] COMMUNICATIONS MANAGEMENT SYSTEM

[76] Inventor: Frederick A. Rose, Rte. 3, Box 529, Fort Atkinson, Wis. 53538

[21] Appl. No.: 943,565

[22] Filed: Dec. 18, 1986

[51] Int. Cl.⁴ .............................................. G06F 1/00
[52] U.S. Cl. ............................. 364/900; 364/948.4; 364/919.4; 364/929.4
[58] Field of Search ... 364/200 MS File, 900 MS File

[56] References Cited

U.S. PATENT DOCUMENTS

| | | | |
|---|---|---|---|
| 4,051,326 | 9/1977 | Badagnami | 364/900 |
| 4,080,659 | 3/1978 | Francini | 364/200 |
| 4,124,773 | 11/1978 | Elkins | 179/2 |
| 4,167,786 | 9/1979 | Miller et al. | 364/900 |
| 4,204,249 | 5/1980 | Dye et al. | 364/200 |
| 4,312,035 | 1/1982 | Greene | 364/200 |
| 4,371,752 | 2/1983 | Matthews et al. | 179/7.1 |
| 4,495,596 | 1/1985 | Sciulli | 364/900 |

Primary Examiner—Thomas M. Heckler
Attorney, Agent, or Firm—Lockwood, Alex, FitzGibbon & Cummings

[57] ABSTRACT

A communications management system for use in conjunction with a host computer includes independently powered processing circuitry which automatically powers up the host computer upon receipt of an incoming message, thereby avoiding the need for the computer to be continuously powered. In the event of a momentary power interruption during operation of the system a battery-powered clock and memory circuit within the system reestablishes the system upon resumption of power to the operating configuration which existed at the time of interruption.

7 Claims, 5 Drawing Sheets

COMMUNICATIONS MANAGEMENT SYSTEM

BACKGROUND OF THE INVENTION

The present invention is generally related to information processing systems, and more specifically to a communications management system for use in conjunction with a personal computer.

Personal computers have proven useful for assisting a user in managing communications over one or more telephone lines. To be of maximum benefit such communications management systems should preferably include the capability of automatically placing and receiving telephone calls, in either voice or digital form, and the capability of receiving, storing, transmitting and relaying messages to and from designated parties, as well as other ancillary functions, such as the maintenance of an appointment calendar on which the receipt of such messages and expectation of future responses can be noted.

One drawback of prior systems intended to provide such features has been the necessity of keeping the host computer powered up at all times during which the possibility of incoming calls exists so that necessary signal processing and decision making with respect to such messages can be accomplished by the hardware and software of the computer. This reduces the service life of the host computer, and undesirably increases power consumption.

The present invention avoids this problem by providing a microprocessor-based system which is independently powered and capable of controlling the application of power to the host computer. The system is provided on a single plug-in circuit board adapted to be received in an existing and conventional expansion port of the host computer, and includes all necessary circuitry for analyzing an incoming message, verifying the messsage and taking appropriate action, including powering up the computer. No modification whatsoever of the computer is required.

In addition, the communications management system of the present invention provides for maintenance of the existing system status in the event of a momentary power interruption of insufficient duration to cause loss of associated telephone or other communications lines.

The plug-in circuit board of the system, in a preferred form, includes a user actuable circuit for initiating an interrupt sub-routine in the host computer. This may provide certain anciliary functions useful in conjunction with the communications management function of the system, such as an appointment calendar or a telephone list.

It will be appreciated that in addition to the communications management application illustrated herein, the auxiliary processing system can be employed for other purposes. For example, the system can be employed to continuously supervise a small plant or manufacturing process, wherein the computer receives, over one or more input channels, readings or signals representing parameters in the supervised plant or apparatus. If such a signal exceeds specified limits, the host computer is powered up and an interrupt is initiated by the monitoring system. In response to such an interrupt the host computer may employ further computation and adjustment in plant operating parameters, if necessary.

Accordingly, it is a general object of the present invention to provide a new and improved communications management system for a personal computer or other small computer system.

It is a more specific object of the present invention to provide a new and improved communications processing system for a personal computer wherein the system is continuously operative for its intended purpose and the host computer is powered-up only when required.

SUMMARY OF THE INVENTION

The invention is directed to a communications management system for use in conjunction with an externally-powered host computer for responding to communication signals on a communications line. The system includes a power source independent of the host computer, and power control means responsive to an applied control signal for applying operating power to the host computer. Control circuit means responsive to the communications signal on the communications line and operable from the independent power source are provided for applying a control signal to the power control means upon receipt of the communications signal to power up the computer.

The invention is further directed to a communications management system for use in conjunction with a host computer for responding to communication signals on a communications line. This system includes signal processing means for responding to the communications signals to establish a receive, store, transmit or redirect communications operating status relative to the communications line and for providing a status signal indicative thereof. A battery back-up power source and memory means operable from the battery back-up power source are provided for storing the system status signal. Means responsive to the stored system status signal following a momentary power interruption are provided for reconfiguring the signal processing means to the status of the system at the time of power interruption.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
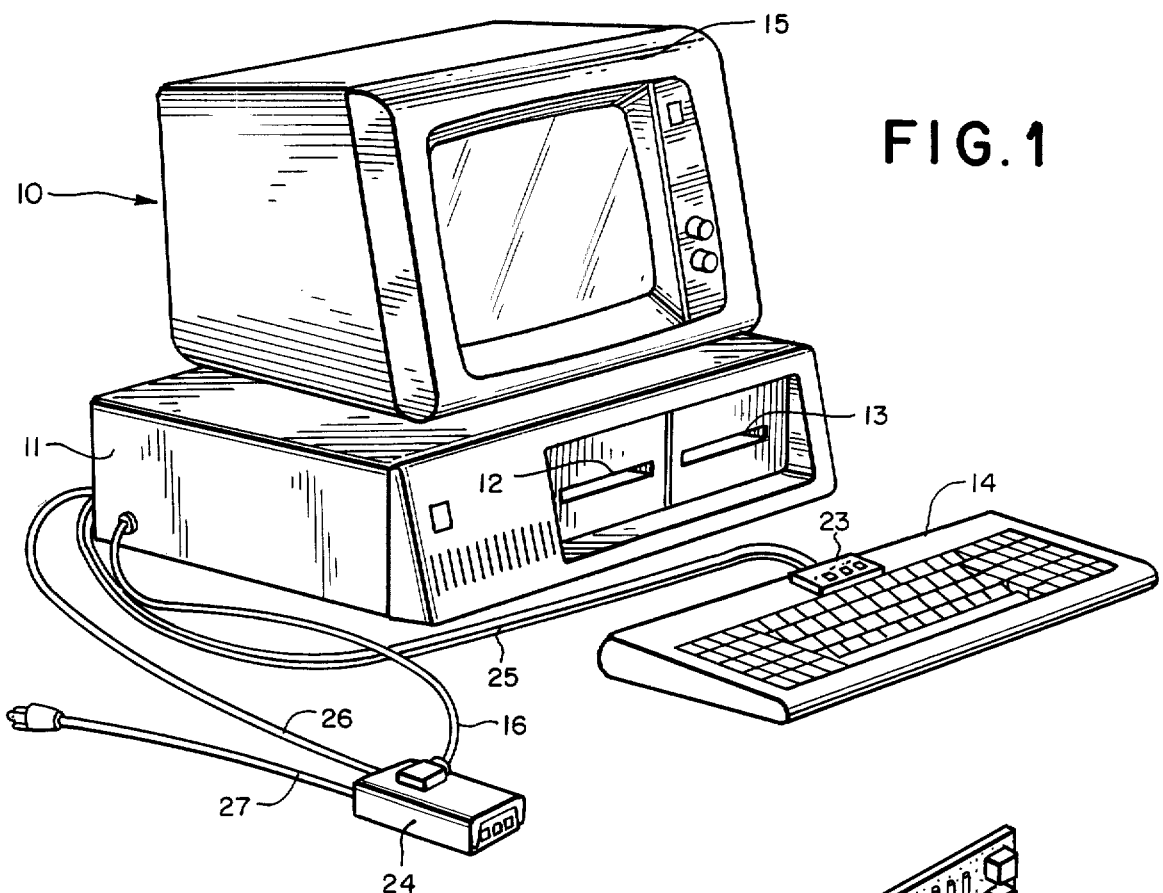
FIG. 1 is a perspective view of a personal computer having a communications management system constructed in accordance with the invention installed therein.

Referring to the Figures, and particularly to FIG. 1, a personal computer 10 of a type suitable for use as host computer to the communications management system of the present invention is seen to include generally a main processing unit 11, a pair of disc drives 12 and 13, a keyboard 14 and a monitor 15. The five components of computer 10 may be conventional in design and construction and may be conveniently mounted as shown, the alternating line current being provided to the units by means of single power cord 16 extending from the main computing unit 11.

Figure 2:
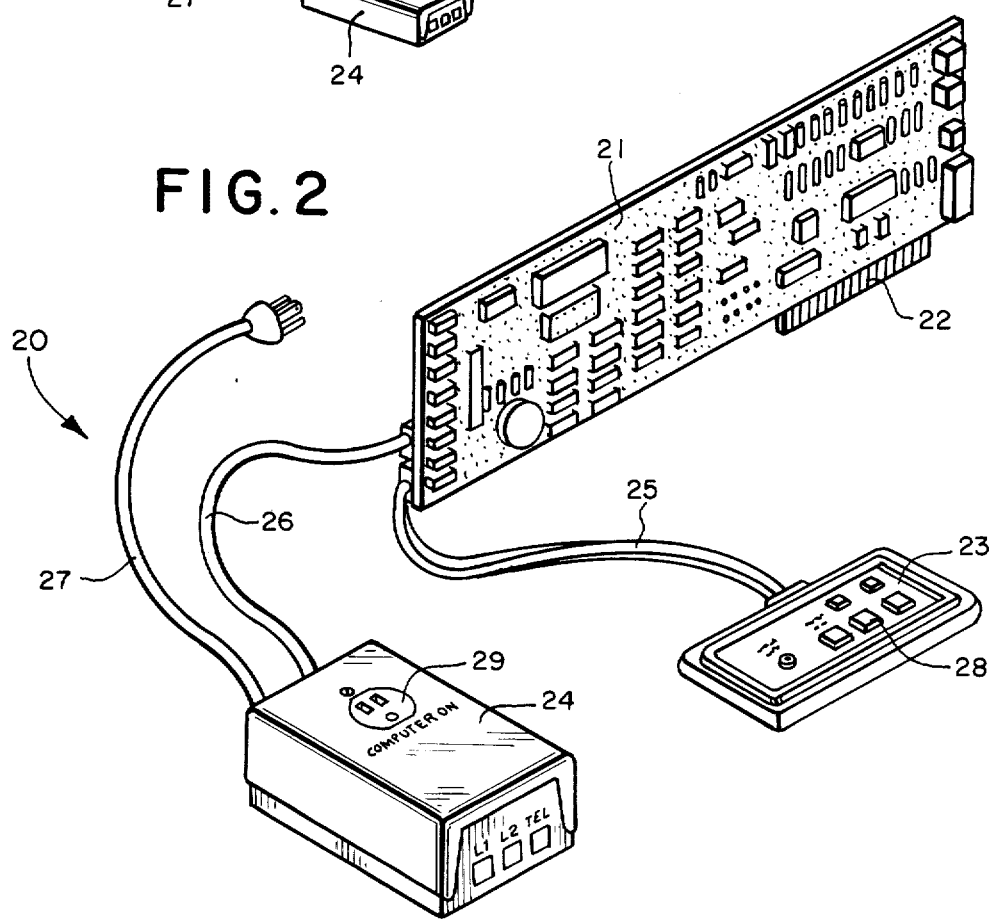
FIG. 2 is a perspective view of the communications management system showing the principal components of the system.

Referring to FIG. 2, a communications management system 20 constructed in accordance with the invention for use with personal computer 10 is seen to include a circuit board 21 adapted to fit within an expansion slot (not shown) within the computer. To this end, the circuit board 21 includes a connector 22 which mates with the connector provided in the expansion slot in a manner well known to the art. The communications management system 20 further includes a local keyboard 23 and a power control and telephone line interface module 24. Keyboard 23 is connected to circuit board 21 by a cable 25 and module 24 is connected to circuit board 21 by a cable 26. A conventional electrical power cord 27 is provided to supply alternating current to module 24.

The top surface of actuator panel 23 includes a push button type actuator switch 28 for a designated auxiliary function of the communications management system. Various other switches for various other functions, such as a remote computer power switch, as well as various indicator lights, can be provided on the subpanel as required by a particular application in which the communications management system is utilized.

When the communications management system 20 is installed in personal computer 10 the power cord 16 of the computer is inserted in a receptacle 29 provided on module 24. As will be seen presently, it is the function of module 24 to control the application of power to computer 10, and the insertion of power cord 16 into the module facilitates such control without modification to the computer.

Figure 3:
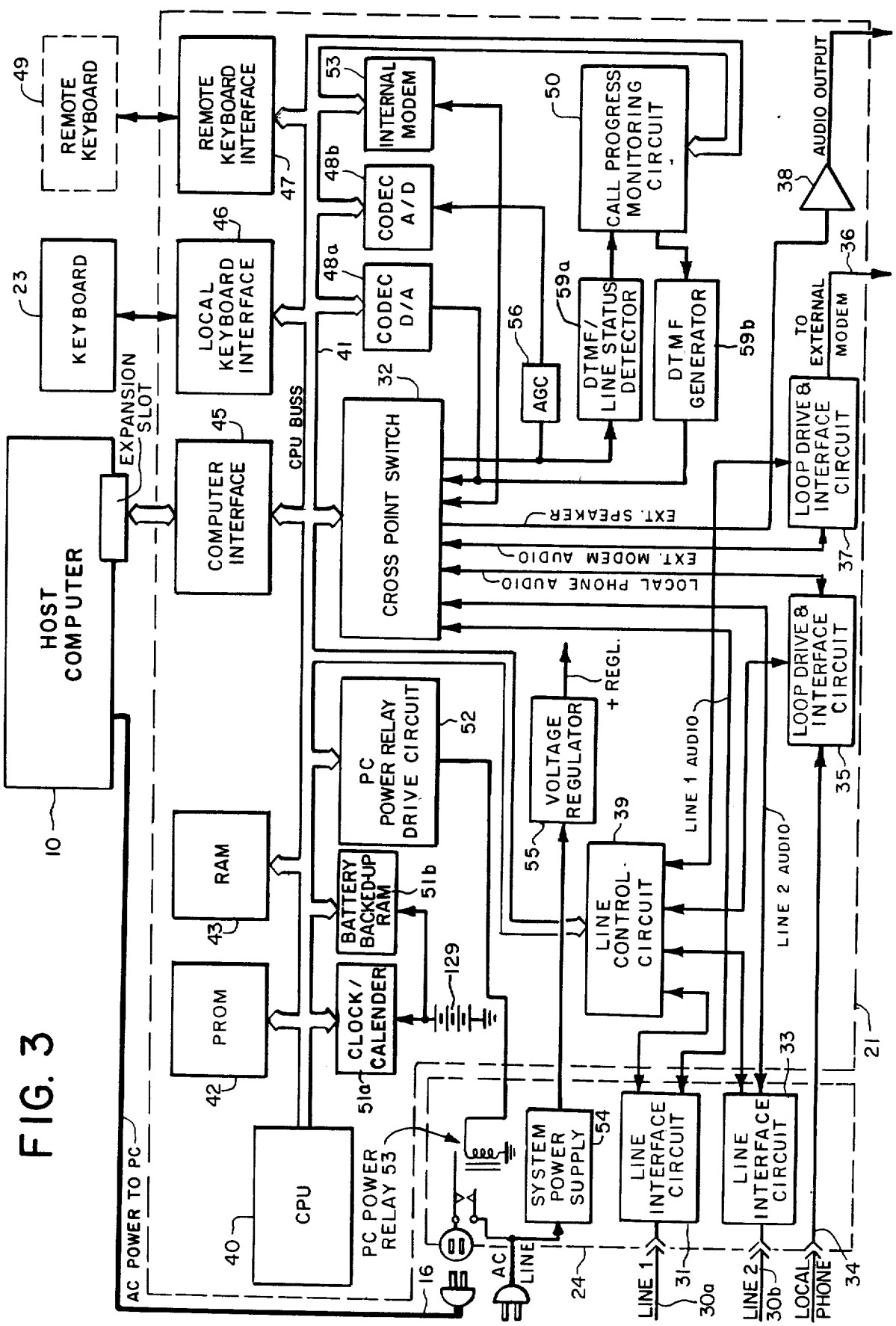
FIG. 3 is a simplified functional block diagram of the communications management system of the invention.

Referring to FIG. 3, the communications management system 20 is seen configured for operation with two telephone lines 30a and 30b. However, it will be appreciated that a lesser or greater number of lines can be accommodated with appropriate modifications to the circuitry of the system. Line 30a is connected to interface circuit 31, which detects off-hook and ring conditions and provides proper isolation for the telephone lines. The output of interface circuit 31, comprising the audio signal present on line 1, is applied to a cross point switch device 32 on circuit board 21. Similarly, line 2 is applied to a line interface circuit 33 located within module 24, which is connected to another input of cross point switch 32. A local telephone connected to a line 34 is similarly connected through a loop drive and interface circuit 35 to cross point switch 32. An external modem (not shown) may be similarly connected by a line 36 and loop drive and circuit 37 to cross point switch 32. External audio may be provided by cross point switch 32 through an amplifier 38 to an external speaker (not shown) or other listening device.

Interface circuits 31 and 33 provide for detection of off-hook and ring conditions in addition to providing an isolated audio signal to cross point switch 32. Interface circuits 35 and 37 provide necessary loop drive current for their associated telephone apparatus in addition to detecting off-hook and ring conditions. The operating status (off-hook or on-hook) of the interface circuits is controlled by a line control circuit 39 which provides appropriate status control signals to the interface circuits. In addition, the condition of the lines associated with each interface circuit as detected by that interface circuit, is signaled to line control circuit 39. As will be seen presently, this circuit is in communication with the microprocessor-based logic decision and control elements of communications management system 20 so that the appropriate communication status is maintained with each of the external communications lines.

Cross point switch 32 and line control circuit 39 are connected by a conventional data control and address bus (CPU bus) 41 to a central processing unit (CPU) 40, which may be conventional in design and construction. For example, in the particular application herein described a Hitachi type 64180 CPU has been utilized. In a conventional manner, the CPU address bus 41 is connected to a PROM 42, a RAM 43, a computer interface circuit 45, a local keyboard interface circuit 46, a remote keyboard interface circuit 47, a CODEC digital-to-analog converter circuit 48a, a CODEC analog-to-digital circuit 48b, a call progress monitoring circuit 50, a calendar and clock circuit 51a and associated RAM 51b, and a PC power relay drive circuit 52. The output of the power relay drive circuit 52 is connected to a power control relay 53 within module 24 through cable 26 (FIG. 1). Relay 53 may be either a conventional electromechanical component as shown, or a solid state equivalent, such as a triac.

When relay 53 is actuated by drive circuit 52, the host computer 10 is connected to and powered by the AC line through module 24. Module 24 also contains a power supply circuit 54 for supplying operating power through a voltage regulator 55 on circuit board 21 to the various components and circuits of the communications management system 20. The remote keyboard interface 47 is intended for use with an additional optional remote keyboard 49.

To provide for recognition and control of the progress of a particular telephone communication, cross point switch 32 causes a selected one or more of input lines 30a, 30b or 36 to be connected to a dual tone multi frequency (DTMF) detector 59a and a dual tone multi frequency (DTMF) generator 59b. The two DTMF detectors are in turn connected to call progress monitoring circuit 50, which coordinates the detection and generation of signaling tones on the telephone lines during operation of the system. In use, progress monitoring circuit 50 provides signals on bus 41 indicative of the occurrence of various DTMF touch tone user-initiated code signals on the telephone lines, and controls the operation of generator 59b in providing such tones on the telephone lines to signal other users when required. Call progress monitoring circuit 50 also provides signals on bus 41 indicative of the telephone company "call progress" signals, such as dialtone signal, ring signal, busy signal, etc.

The selected input from cross point switch 32 is also applied through an AGC circuit 56 to CODEC analogto-digital converter 48b, which converts voice transmissions on telephone lines 30a and 30b to serial digital form for conveyance by bus 41 to appropriate storage locations. The CODEC digital-to-analog converter 48a provides for conversion of serially occurring digital data on bus 41 to an analog form for transmission to cross point switch 32. The CODEC in this particular applicaiton is a Texas Instrument type TMS2916. In practice, a single CODEC module may be provided to perform both the digitization and reconstruction of the waveform.

Figure 4:
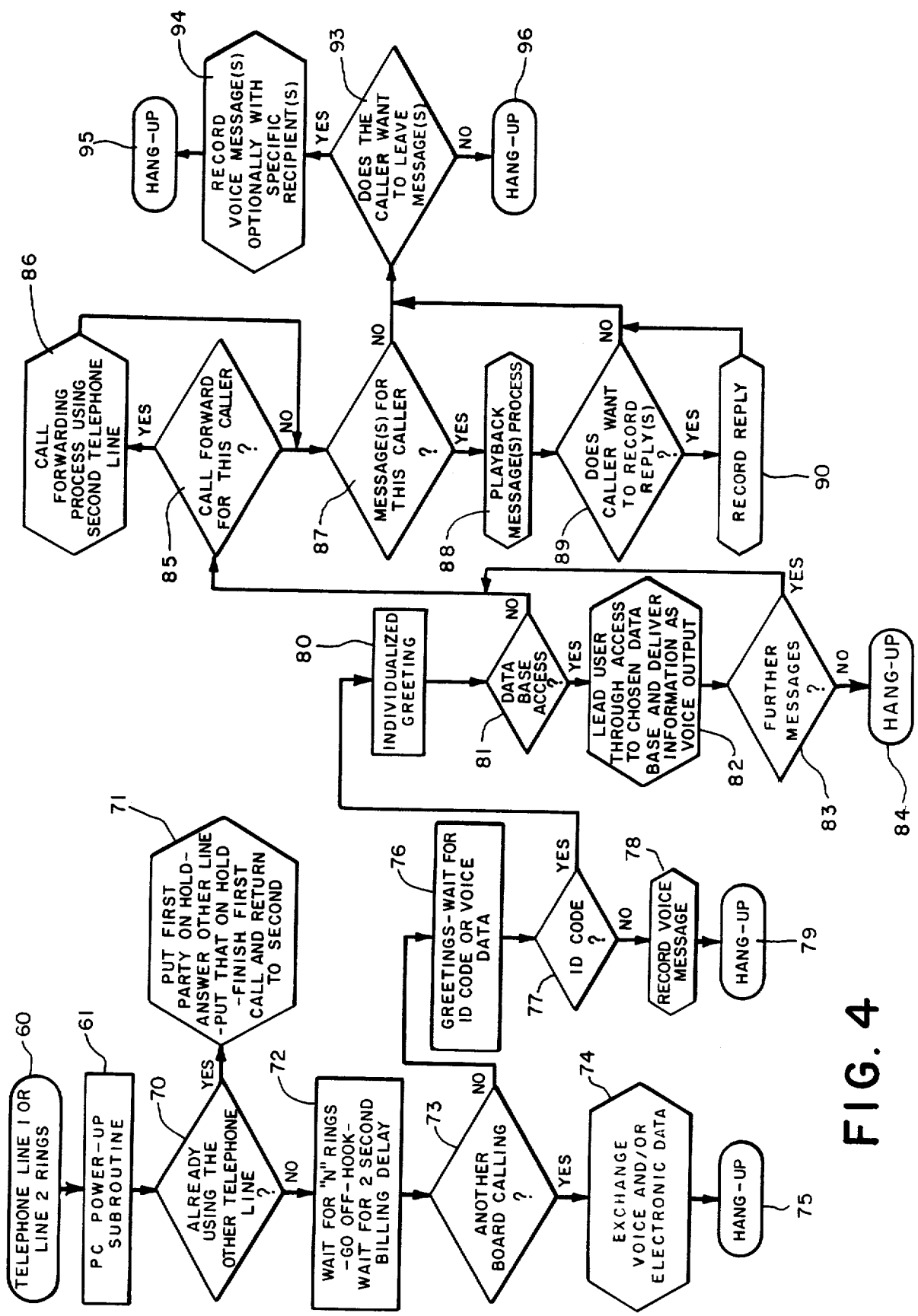
FIG. 4 is a simplified flow chart showing the principal decision processes involved in the functioning of the communications management system of the invention.
Figure 5:
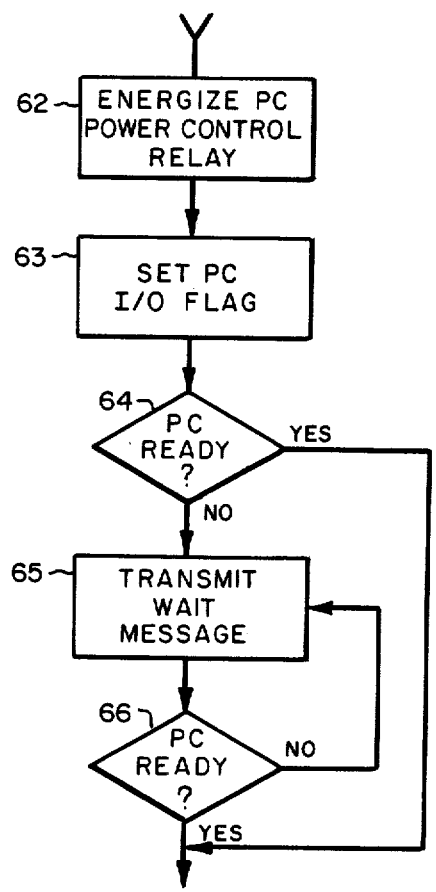
FIG. 5 is a simplified flow chart showing the principal decision processes involved in the host computer being powered up by the communications management system.

Referring to FIG. 4, in operation the ringing of either line 1 or line 2 at step 60 causes communications management system 20 to perform a PC power up subroutine at step 61. In this routine, as shown in FIG. 5, the PC power control relay 53 is energized at step 62 to apply line voltage to the host computer 10 if the computer is not already on. When used in this application the host computer is connected to the controlled outlet 29 on module 24 and the normal ON/OFF power switch on the computer is left in the ON position, thereby allowing the communication management system to control powering o of the computer without the need for modifications to the computer. As the host computer powers up, which may take as long as 45 seconds depending o the particular architecture of the computer, processor 40 causes, at step 63, an input/output (I/O) flag to be set at computer interface 45. This signals the host computer that the management system resident on board 21 requires use of the host computer. Once the I/O flag has been set processor 40 inquires at step 64 through interface 45 whether the host computer is operative. In the event that the host computer is not operative, a wait message is transmitted on the incoming line at step 65. This message is digitally recorded in RAM 43. If required by the application, the CPU 40 can initiate the sending of an appropriate message stored in RAM 43 over either telephone line by making the appropriate connections between RAM 43, CODEC 48a and either line interface circuit 31 or 32. When the host computer is finally operational, as signaled through computer interface 45 to processor 40, the system proceeds through step 66 and returns to the main processing routine shown in FIG. 4.

Upon returning to the main routine, should the communications management system 20 be already using the other telephone line, as determined at step 70, a subroutine is entered at step 71, in which the first party is put on hold by appropriate directions from processor 40 to line control circuit 39 and interface circuits 31 and 33, and the other line is answered as previously described. The second line is put o hold and processing activity is returned to the first line, which is then processed before returning to the second line. This is in accordance with a subroutine at step 71 for which appropriate software has been stored either in RAM 43, or on a conventional disc or other storage medium (not shown) in host computer 10.

After determining at step 70 whether a second phone line is in use, the system waits at step 72 for a specified number of rings prior to going off-hook. Each ring on the active line is recognized by the call progress monitoring circuit 50, and conveyed to processor 40 by means of digital signals conveyed in a conventional manner on bus 41. After a short delay at step 72 (so called billing delay, required by the telephone companies) inquiry is made at step 73 whether the calling party is in fact another communications management system board. This is accomplished by listening for a pair of multi frequency "touch-tone" 'DTMF tones which would be transmitted by another board.

In the event that two specific DTMF tones are transmitted on the incoming line, system 20 responds at step 74 by connecting the incoming line through cross point switch 32 to either internal modem 53, which converts transmitted digital data directly to serial digital data on bus 41, or to CODEC converts 48a and 48b, which convert transmitted voice data to digital data. The data is conveyed by bus 41 under the control of processor 40 to appropriate locations either in RAM 43 or in a storage medium of host computer 10 through computer interface 45. Upon completion of the data exchange, which may take place in either direction through modem 53, the transmission is terminated and the associated line interface circuit is conditioned to a disconnect or hang-up condition by line control circuit 39 in accordance with control signals developed on bus 41 by processor 40 during step 75.

In the event that the calling party is not another system, voice greetings are transmitted at step 76. At this time the management system makes inquiry as to the ID code of the caller, which may consist of a multi-digit code number transmitted by the caller using conventional DTMF touch-tone signals. For example, in the particular embodiment illustrated, the code may be preceded by a pound (#) symbol where the user desires and is authorized for data base access, and may be merely followed by such symbol where no data base access is desired or authorized. The voice message transmitted at step 76 may be stored in memory in digital form, and conveyed through CODEC 48a to the active line through cross point switch 32 under the control of processor 40.

The ID code transmitted by the caller is compared with previously stored valid codes in step 77 to determine the authority of such caller for access to information. A record of such codes may be maintained in storage either in the host computer 10 and accessed through interface 45, or may be contained within RAM 43, depending on system capacity. If the ID code is not valid and no system access is permitted, the caller is given the opportunity to store a message in step 78 and the call is terminated at step 79 by the appropriate line interface circuit under the direction of processor 40.

Once access has been granted at step 77, communications management system 20 issues an individualized greeting at step 80 by vocalization of digitally stored statements, as previously described. Following such greeting at step 80 inquiry is made at step 81 as to whether the caller requires access to the stored data base, which may be contained on disc or other storage medium in host computer. This request is indicated by the presence of a # symbol preceding the caller's access code. Assuming such request, and assuming the previously transmitted ID code number is valid for data base access, the caller is led through the data base in accordance with a subroutine at step 82. This subroutine may cause a number of vocalized (or voice) menus to be presented to the user to provide for efficient localization of desired data. Having completed inquiry of the data base, the caller is queried at step 83 whether he desires to leave a message. In the affirmative, step 85 is entered, and in the negative a hang-up routine at step 84 is initiated.

Assuming no further data base access, the system checks whether or not the owner has requested that calls from this particular caller be forwarded to another number. If so, communications management system 20 initiates a call forwarding subroutine at step 86 using the other telephone line. If no call forwarding is desired, an inquiry is made by the system at step 87 as to whether messages exist for this caller. This is accomplished by searching a digitally stored listing of message addressees in either host computer 10 or RAM 43 for the particular caller, as previously identified by ID code at step 77. If a message is waiting, such message is transmitted from its digital location, in either host computer 10 or RAM 43, to the caller in step 88. Following such message, the caller is queried at step 89 whether he or she desires to record a reply. In the affirmative, a record subroutine is entered into at step 90 by which a message is stored digitally by the caller. Finally, the caller is queried at step 93 whether he wants to leave any messages. If so, the messages are recorded for specific recipients in a subroutine at step 94 and upon completion the associated line interface circuit is conditioned to hang-up status at step 95. In the event no messages are to be left, a similar hang-up condition is obtained at step 96.

In each case where an inquiry is made of a caller, digitally stored verbal questions are conveyed from either a storage medium in host computer 10, such as a disc, through computer interface 45 to bus 41, or from RAM 43 on system board 21 to bus 41. CODEC converter 48a then converts each such digitized message to an analog audio signal which is conveyed through cross point switch 32 to the appropriate line interface circuit. The timing and routing of such data occurs under the control of processor unit 40 which operates under control of a program stored in PROM 42 and RAM 43. In practice, a portion of the software program may be stored in an appropriate medium in host computer 10 and conveyed to RAM 43 periodically as required through computer interface 45.

Responses made by the caller, when in the form of DTMF touch-tone signals, are decoded by detector 59a and applied to call progress monitoring circuit 50. This circuit is periodically addressed by processor 40 through bus 41 to determine the status of the call that any particular instant and responses made by the caller to verbal inquiries. Call progress monitoring circuit 50 is conditioned by processor 40 to provide outgoing DTMF signals under certain circumstances, as when communicating with another computerized management system. In such cases DTMF generator 49b is conditioned by circuit 50 to provide the necessary DTMF tones through cross point switch 32 to the appropriate line through line interface circuits 31 and 33. The line interface circuits 31 and 33 are at all times under control of line management circuit 39, which receives instructions from processor 40 by way of data bus 41.

When voice communications are received from the caller for storage, such communications are connected by cross point switch 32 to CODEC 48b through AGC circuit 56. CODEC 48b digitizes such voice messages and conveys them serially along bus 41 to a storage location designated by processor 40. Typically, the data are buffered into temporary locations in RAM 43, and then periodically transferred to an appropriate location on a disc or other storage location in host computer 10 to which access is provided by computer interface 45.

Figure 6:
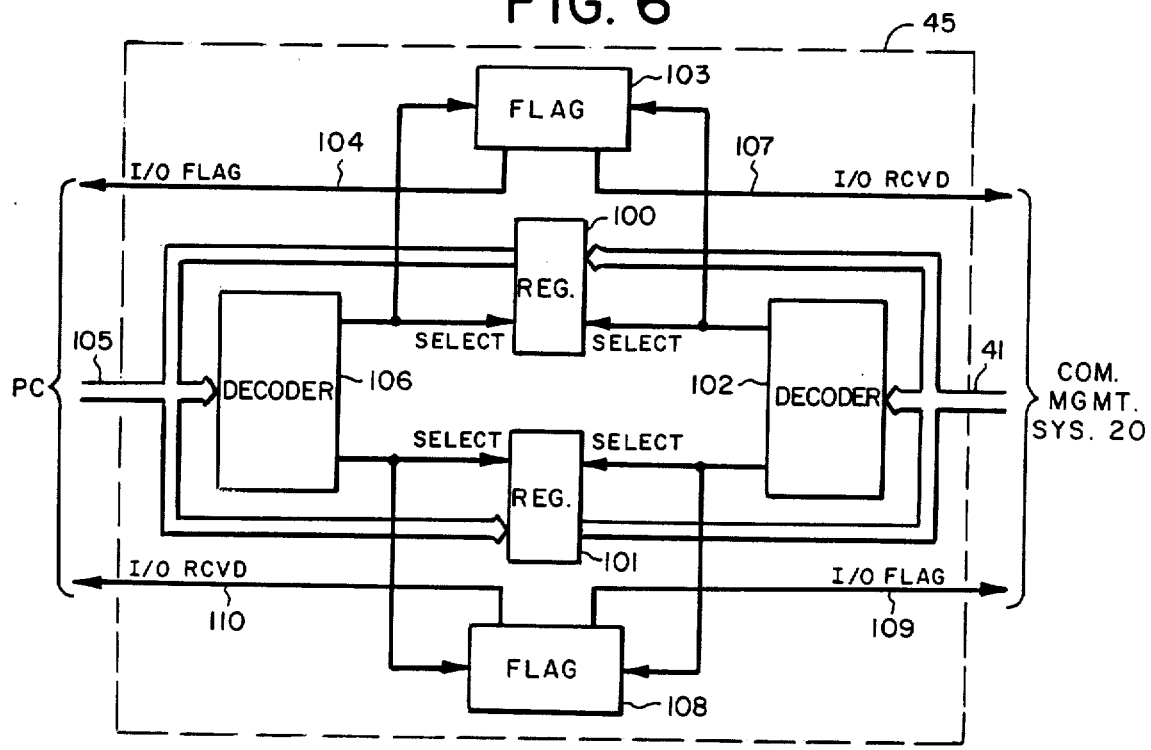
FIG. 6 is a simplified functional block diagram of the interface circuit utilized in the communications management system of the invention.

Referring to FIG. 6, the computer interface circuit 45 relied upon to convey digital data between the data and address buses (not shown) of the host computer 10 and the data in address buses 41 of communications management system 20 may be conventional in construction and operation. In particular, the interface circuit may include a first register 100 for buffering data read out from system 20 to computer 10, and a register 101 for buffering data read out from the computer to system 20. The occurrence of data to be read out to the computer is determined by a decoder 102 which provides a "select" output which enables register 100 upon the occurrence of an address on bus 41 corresponding to computer 10. This select signal causes register 100 to record the then existing data on the data bus 41 and further causes a flip-flop 103 to be set to indicate on I/O flag line 104 that indicates the presence of data for transmission to computer 10. Within computer 10 appropriate software is conditioned in response to the flag signal on line 104 to cause register 100 to be addressed on a bus 105. A decoder 106 recognizes this address and enables register 100 to read out the previously stored data, at the same time to be reset and thereby provide a signal to system 20 on the I/O received line 107.

Similarly, upon occurrence of data to be transmitted to management system 20 by computer 10 register 101 is addressed on bus 105. This causes decoder 106 to provide a select enabling signal to register 101, causing that device to store the then existing data on bus 105. At the same time, flip-flop 108 is conditioned to provide a flag signal on I/O line 109 of communications management system 20. This causes register 101 to be addressed on bus 41 under the direction of processor 40. Upon recognition of this address by decoder 102 an enabling signal is provided to register 101 to cause that device to read out the stored data on bus 41, and a reset signal is applied to flip-flop 108 to cause the I/O received signal to appear on a line 110 associated with computer 10.

Thus, under the operation of computer interface circuit 45 data is exchanged between of host computer 10 and the communication management system. Typically, computer interface 45 is electrically and mechanically compatible with an existing and conventional expansion slot of the computer so that board 21 can be conveniently mounted within the host computer housing.

Figure 7:
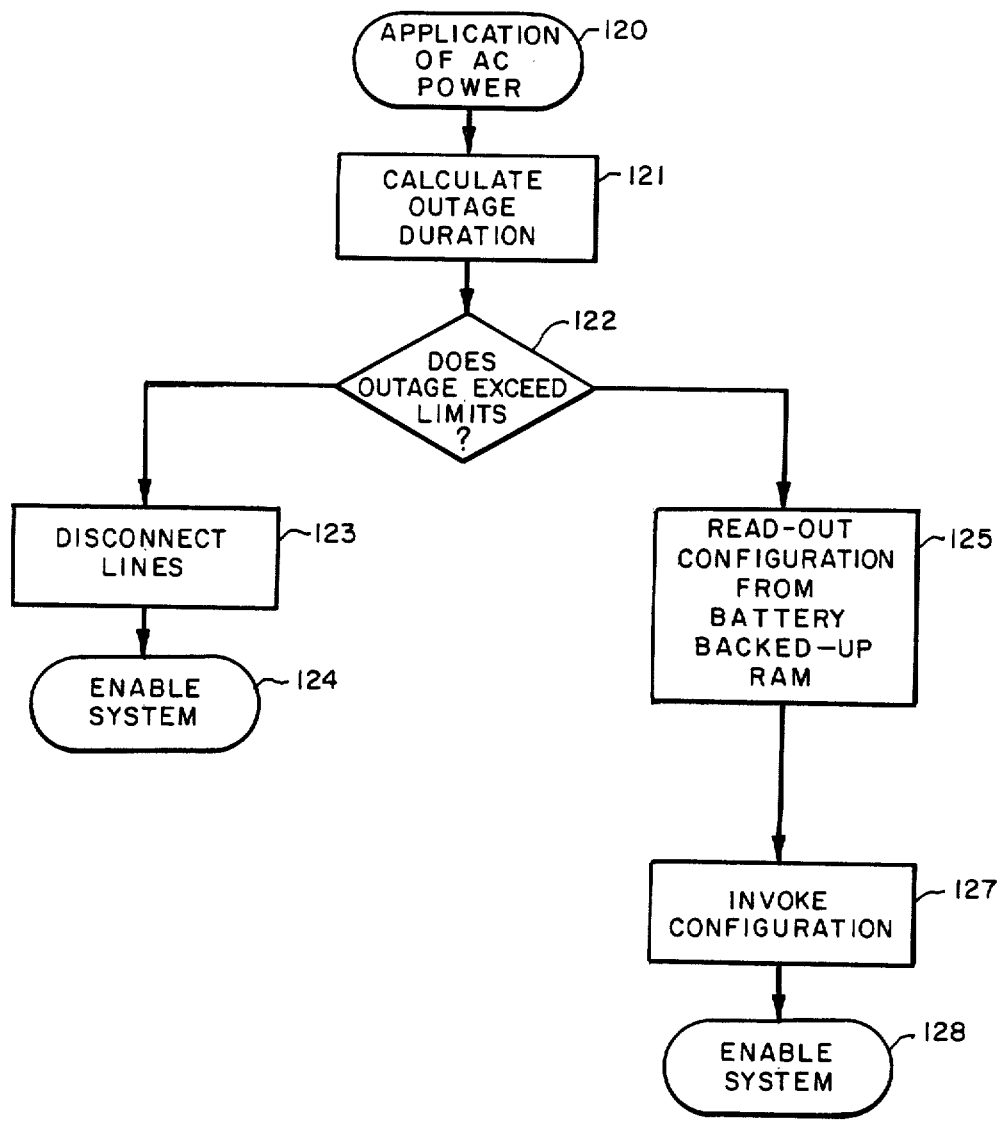
FIG. 7 is a simplified flow chart showing the principal decision processes involved in the functioning of the communications management system in the event of a momentary power loss.

Referring to FIG. 7, in accordance with another aspect of the invention, in the event of power interruption during operation of the communications management system a subroutine is entered into upon subsequent power-up to prevent the unnecessary loss of communications established at the time of the power interruption. Upon recognition of power restoration at step 120 the system calculates at step 121 the duration of the outage. This calculation is made possible by the continuously running clock powered by a backup battery 129 in circuit 51a. In step 122 the outage time period is compared with a predetermined maximum duration time period, which depends on whether the interrupted call wa an incoming call in which case the telephone exchange will tolerate a longer on-hook condition, or an outgoing call in which case the exchange will tolerate only a very short on-hook condition before terminating the connection. For example, for use with a conventional telephonal exchange, the predetermined maximum interruption may be 1 second in the case of a system-initiated call, and 5 seconds in the case of an incoming call. In the event that the predetermined maximum duration has been exceeded the active line or lines are disconnected by appropriate instructions to interface circuits 31 and 33 at step 123 and the system is initialized for further processing at step 124.

In the event that the outage has not exceeded limits, as determined at step 122, processor 40 is caused to refer to the status configuration information previously stored in RAM 51b to determine the status of the system at the time of the power outage. This is done at step 125 by reading out the RAM over data bus 41 and reestablishing interface circuits 31 and 33, 35 and 37, cross point switch 32, and other circuits of the system to their previous operating status. When the read out of RAM 51b is complete, and the system has been reconfigured at step 127, operation of the system is again commenced at step 128.

In this way, unnecessary interruptions of established communications for momentary power outages are avoided.

Although it would be possible in theory to store all of the software required for operation of communications management system 20 on system board 21, a more efficient utilization of available memory capacity is obtained by storing a large portion of the software in an appropriate storage memory, such as on disc, in host computer 10. System software is typically loaded into the host computer on multiple discs and targeted to hard disc for future execution.

Typically, the resident RAM in the communication management system may have a capacity of approximately 256K. 32K is typically required for the resident processing software, leaving the balance of the RAM available for storage of messages for use during power up prior to access to the host computer. The disc drive of the host computer, which may have a capacity of 10 mega bytes or greater typically, is utilized for storing the bulk of the management system software and for message files. Typically, such software and files are read as needed to the management system so that the host computer serves primarily as a storage device.

Upon loss of power to the system board 21 the contents of RAM 43 are lost. Consequently, upon initial power up of circuit board 21 it is necessary to convey to host computer 10 an interrupt signal so that the required software can be loaded from computer 10 into RAM memory 43. Such an interrupt signal can be provided by processor 40 under the direction of instructions in PROM 42.

It will be appreciated that various memory configurations and software arrangements can be provided in communications management system 20 to achieve various different and additional features, including the provision of a telephone directory for viewing on the computer monitor and a calendar of appointments and expected response times. In addition, various other communications features such as the addition of additional lines or the automatic dialing of multiple numbers can be provided as required by specific applications.

It will be further appreciated that although this embodiment uses DTMF responses from users it would be possible to substitute other responses, including voice responses, where appropriate circuitry and software would be provided to allow voice recognition.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A communications management system for use in conjunction with an externally-powered host computer for responding to communications signals on a telephone line, comprising:
   a power control means in the form of a relay, said relay being electrically connected to a power source and responsive to an applied control signal for supplying operating power from said power source to the host computer;
   a printed circuit board connected to said host computer, said printed circuit board including control circuit means electrically connected to said power control means for supplying said control signal to said relay to power up said host computer, said control circuit means supplying said control signal in response to receiving the communications signals on the telephone line; and
   means for processing information received over said telephone line following said power up of said host computer, said means for processing including an analog-to-digital converter operatively associated with said control circuit means and storage means for retrievably storing said information within either said management system or within said host computer, said storage means being electrically connected to said analog-to-digital converter.

2. A communications management system as defined in claim 1 wherein said power control means controls the application of said operating power to said host computer when said host computer is electrically connected to said power control means.

3. A communications management system as defined in claim 1 wherein said host computer includes an expansion port having a first connector, and the communications management system includes a second connector, said second connector mating with said first connector whereby said management system communicates with said host computer through said first and second connectors.

4. A communications management system as defined in claim 1, said management system further comprising a continuously running clock circuit on said printed circuit board, said clock circuit having a battery back-up power source, said clock circuit being electrically connected to said control circuit means, memory means operatively associated with said clock circuit, said memory means adapted to store the operating status of said system, and circuit means associated with said memory means and said clock circuit for reestablishing said operating status of said system following a power interruption.

5. A communications management system as defined in claim 4 wherein said clock circuit is operable from said back-up power source, said circuit means being responsive to said clock circuit and said memory means for reestablishing said operating status only when said power interruption does not exceed a predetermined maximum time period.

6. A communications management system for use in conjunction with a host computer for responding to communications signals on a telephone line, comprising:
   a printed circuit board connected to the host computer, said printed circuit board including signal processing means for responding to communications signals to establish the communications management system and the host computer at an operating state relative to the telephone line, and for storing such operating state information;

a clock circuit including a battery back-up power source, said clock circuit being associated with said signal processing means on said printed circuit board;

memory means for storing said operating state information, said memory means being operatively associated with said clock circuit and powered by said battery back-up power source;

means for processing information received over said telephone line when said signal processing means has been reconfigured to said stored operating status, said means for processing information including an analog-to-digital converter operatively associated with said signal processing means and storage means for retrievably storing said information within either said management system or within said host computer, said storage means being electrically connected to said analog-to-digital converter;

circuit means responsive to said memory means containing said stored operating state information for reconfiguring said signal processing means to said stored operating state; and said circuit means reconfiguring said signal processing means to said stored operating state following momentary power interruption.

7. A communications management system as defined in claim 6 wherein said clock circuit is operable from said back-up power source, said circuit means being responsive to said memory means for reestablishing said operating state only when said power interruption does not exceed a predetermined maximum time period.

* * * * *